Inventors
Henry E. Hull
Theodore H. Rote
By Mason, Porter & Diller
Attorneys

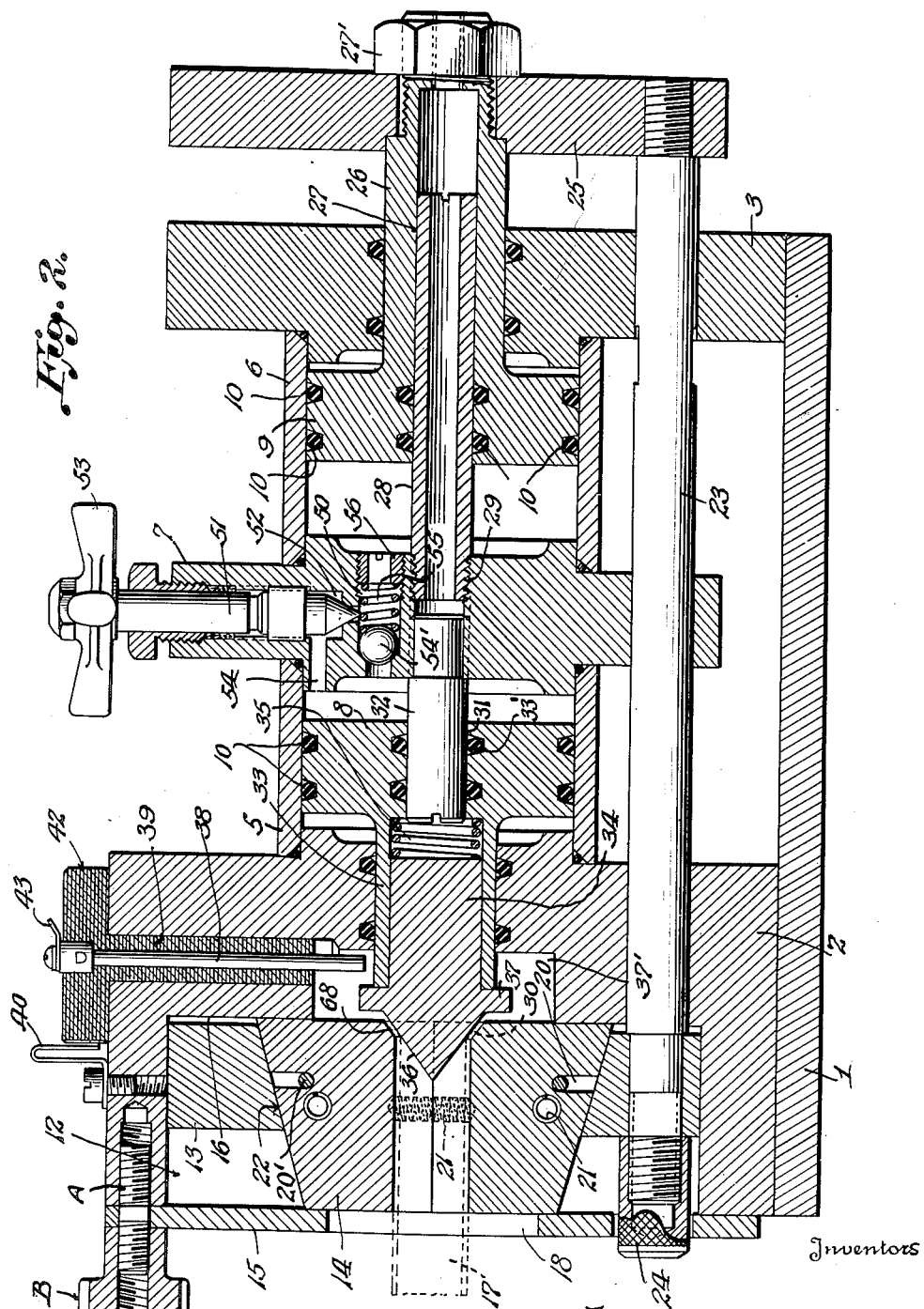

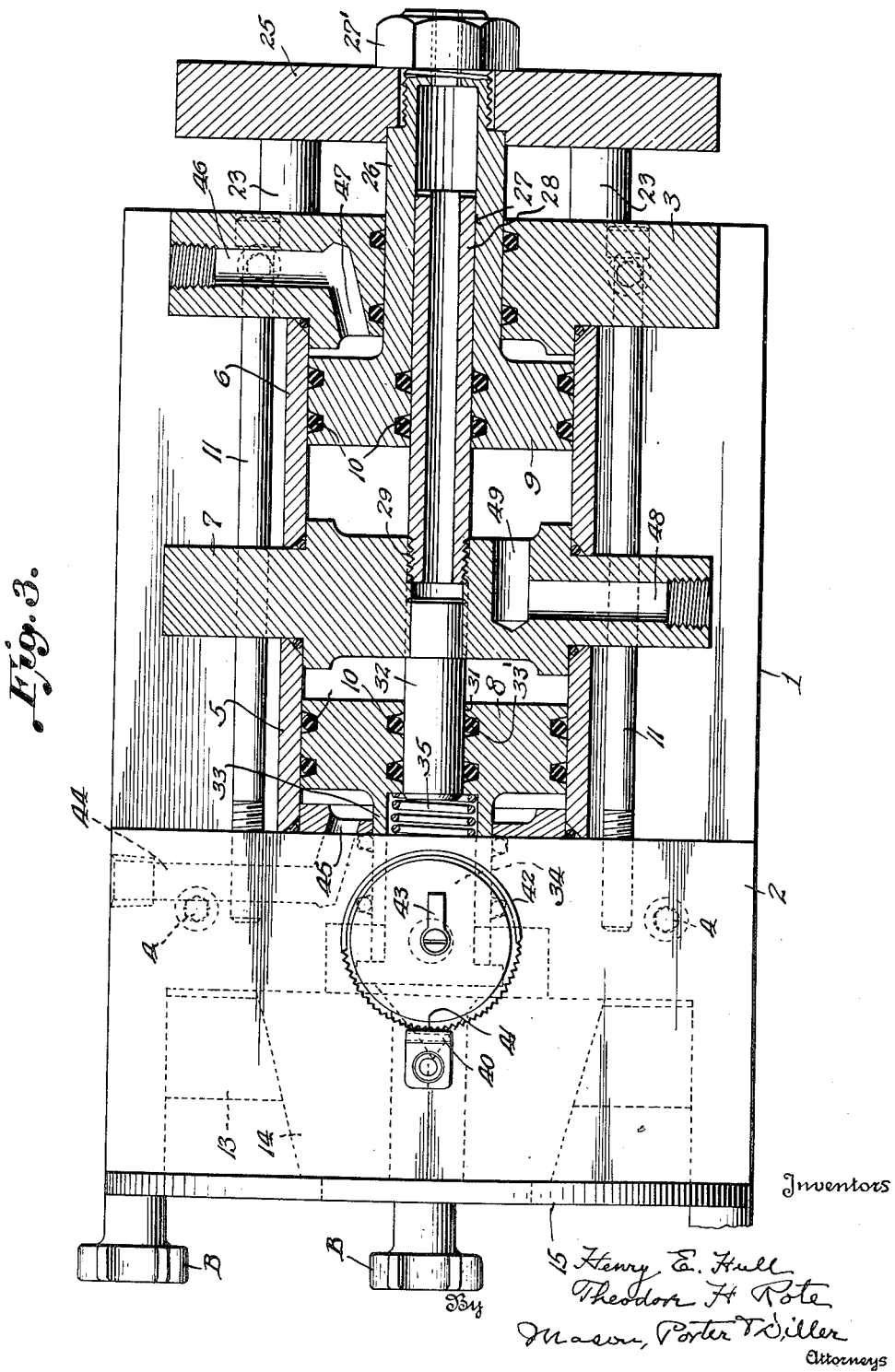

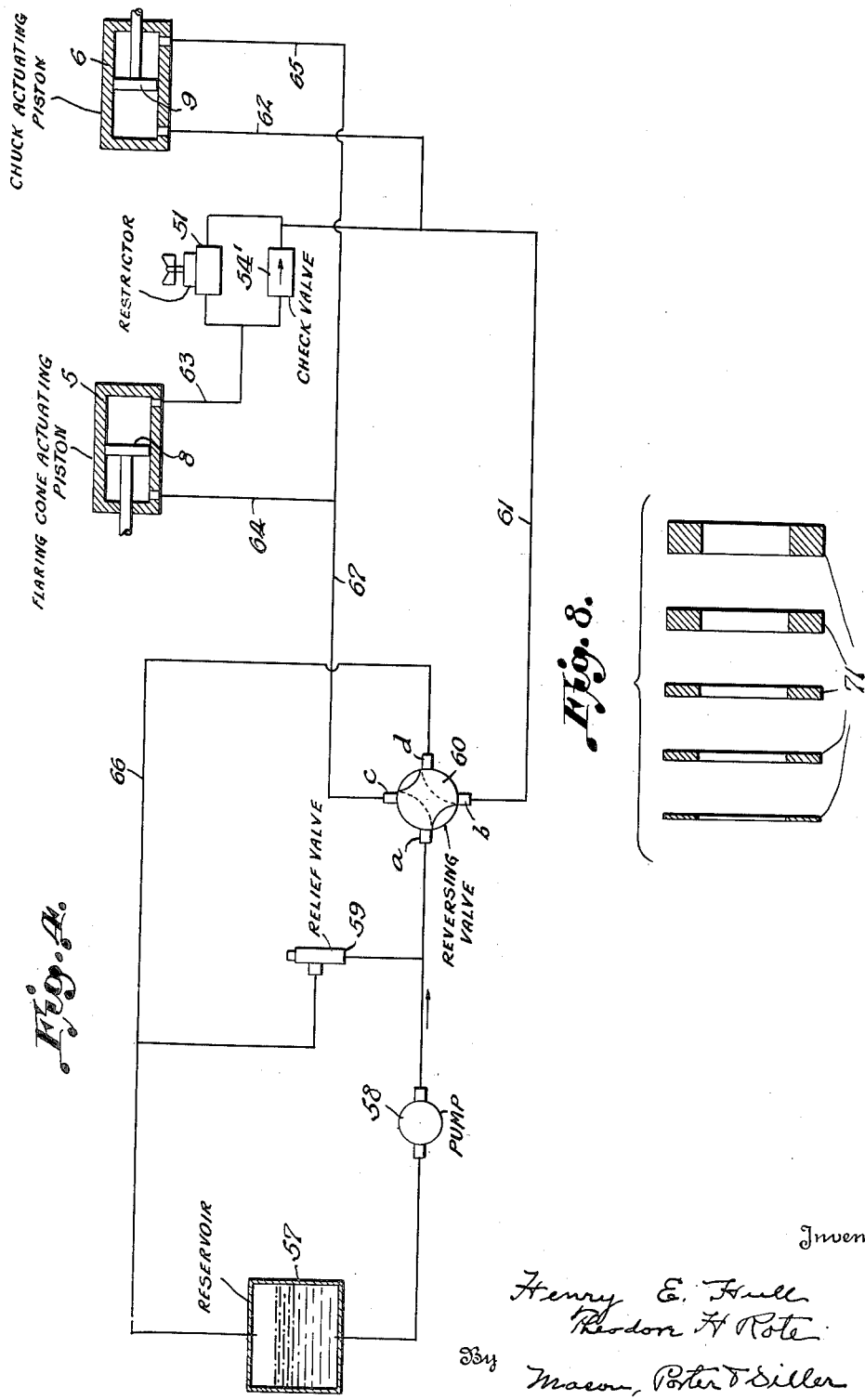

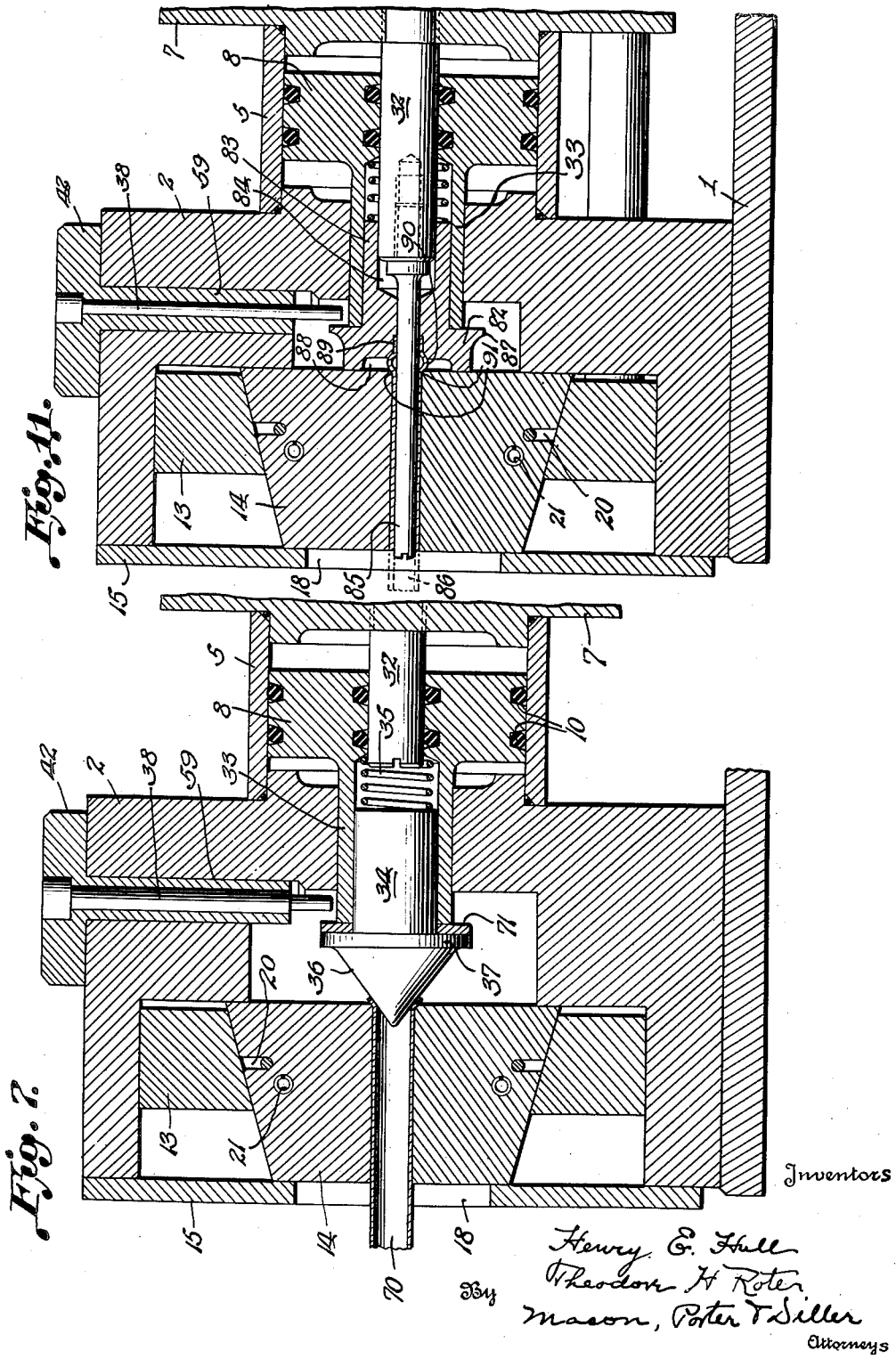

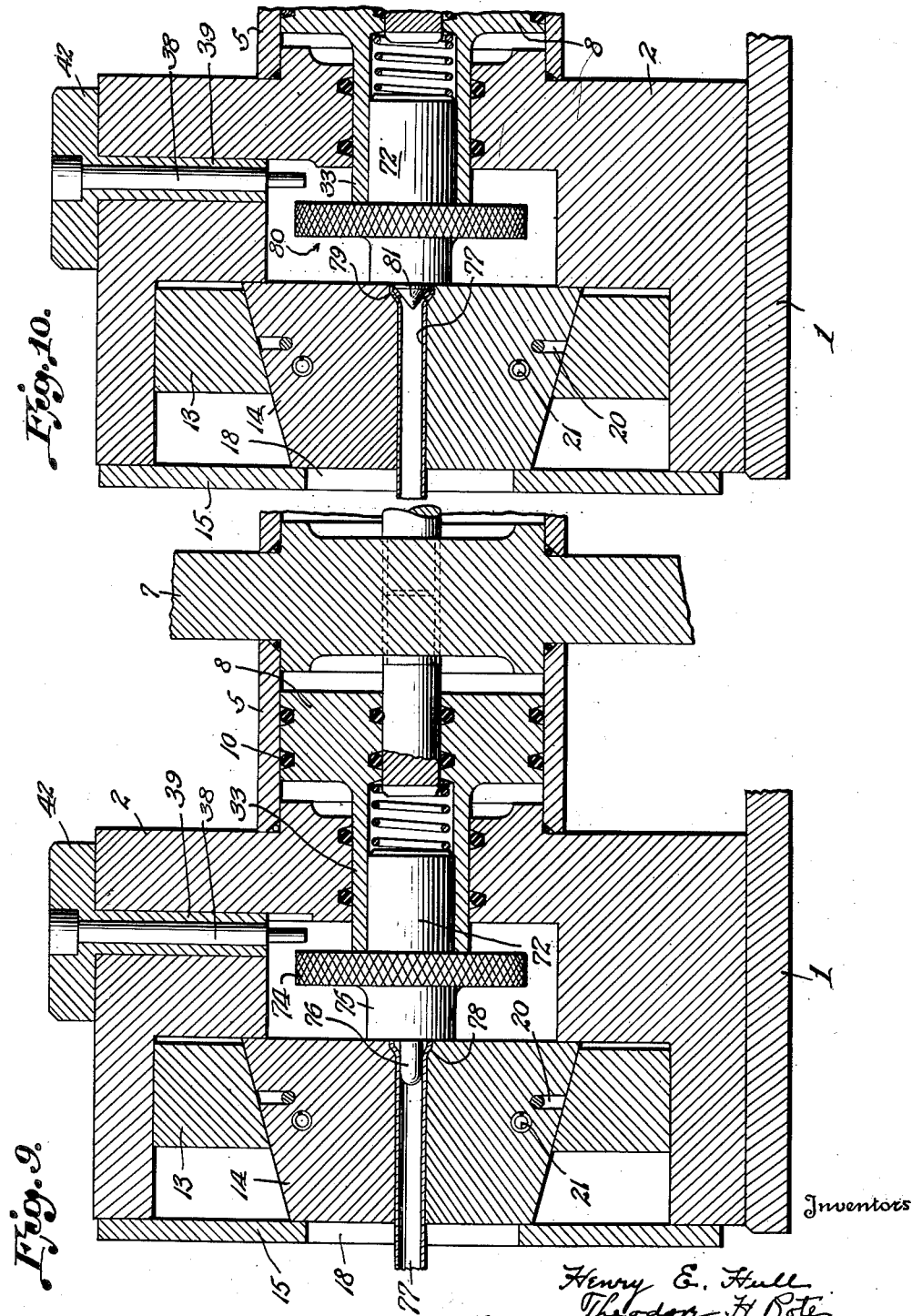

Patented Aug. 2, 1949

2,478,102

UNITED STATES PATENT OFFICE 2,478,102

FLUID PRESSURE APPARATUS FOR SUCCESSIVELY CLAMPING AND DEFORMING TUBE ENDS

Henry E. Hull and Theodore H. Rote, Cleveland, Ohio, assignors to The Parker Appliance Company, Cleveland, Ohio, a corporation of Ohio Application December 26, 1944, Serial No. 569,751

10 Claims. (Cl. 153—79)

The present invention relates to tube machines and more particularly to hydraulically operated tube end deforming machines.

An important object of the invention is to provide a tube deforming machine with novel means for positioning and clamping the end of the tube to be deformed, and hydraulic means associated therewith for actuating the clamping and deforming means.

Another object of the invention is to provide a tube deforming machine of the above character wherein the clamping means comprises a chuck formed of equal segments and having means for releasably engaging the segments on the tube as it is inserted and removed from the machine.

A further object of the invention is to provide a tube deforming machine of the above character wherein there is employed a pair of pistons operating in individual cylinders, one of the pistons actuating the tube clamping means and the other piston actuating the tube deforming means.

A still further object of the invention is to provide a tube deforming machine of the above character wherein valve means is provided between the pistons to assure quick release of the clamping means and quick withdrawal of the deforming means after the deforming operation has been completed.

These and other objects will in part be obvious and will in part be hereinafter more fully disclosed.

In the drawings:

Figure 2 is a vertical sectional view taken substantially on line 2—2 of Figure 1.

Figure 3 is a horizontal sectional view, partly in plan, taken substantially on line 3—3 of Figure 1.

Figure 4 is a schematic diagram of the hydraulic circuit for operating the machine.

Figure 7 is a vertical sectional view illustrating a slightly modified form of tube deforming machine which enables tubes of different sizes to be flanged.

Figure 8 is an elevational view of a series of collars used in Figure 7.

Figure 9 is a fragmentary vertical sectional view of a modified form of deforming tool illustrating the first operation of double flaring a tube end.

Figure 10 is a view similar to Figure 9 illustrating the second operation of forming the double flared end.

Figure 11 is a fragmentary vertical sectional view illustrating the invention as used for forming a bead on a tube.

Figure 1:
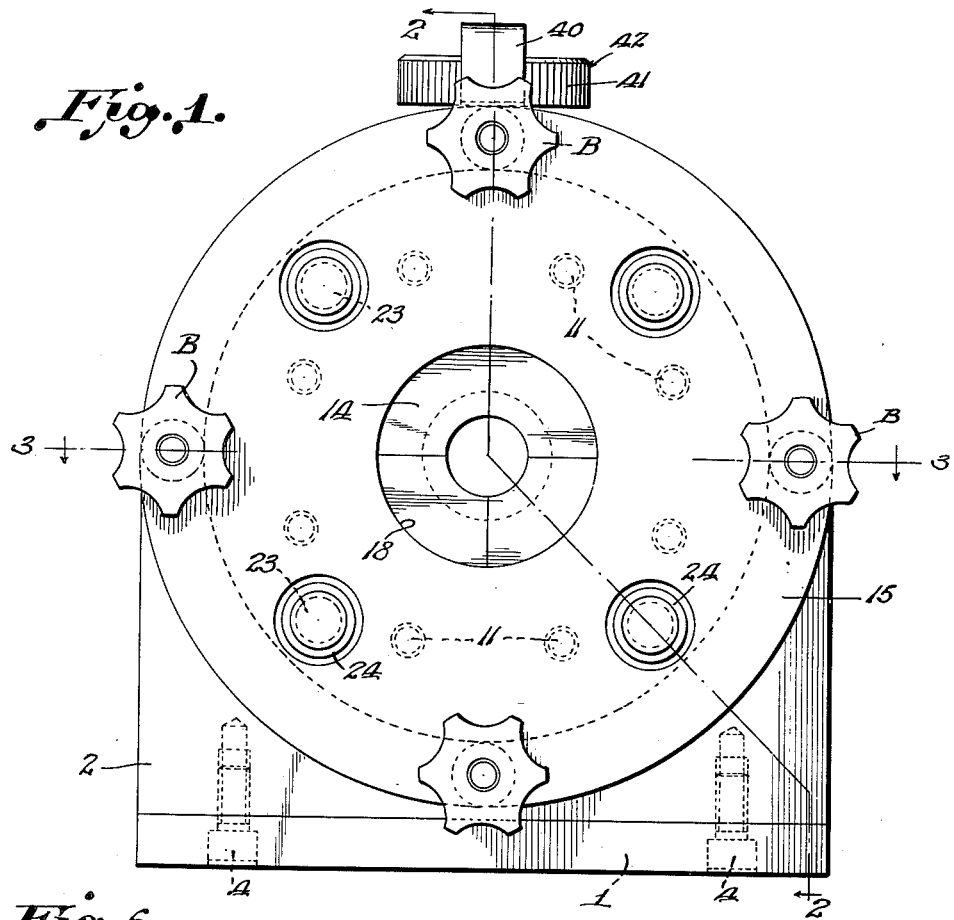
Figure 1 is an end elevational view of a tube deforming machine embodying the features of the present invention.

Referring to the drawings for a more detailed description thereof, and particularly Figures 1, 2 and 3, the new and improved machine comprises a substantially rectangular shaped base plate 1 on which is mounted spaced upright members 2 and 3, said members being mounted at each end of the base plate and secured thereto by means of bolts or the like 4. Mounted between the uprights 2 and 3 is a pair of cylinders 5 and 6 maintained in spaced relation by means of the spacer bar 7. The cylinder 5 carries a piston 8 and the cylinder 6 carries a piston 9, said pistons being suitably packed by means 10 within the cylinder, and the function of which will be hereinafter more fully described. The uprights 2 and 3, cylinders 5 and 6, and spacer member 7 are linked together by means of the tie bolts 11, there being preferably provided eight of these tie bolts as shown in Figure 1 of the drawing.

The front upright member 2 is formed with an annular recess 12 at its outer end for receiving a cam ring 13 and chuck 14, the chuck being held against longitudinal movement by means of the plate 15, and said plate being held in position by means of studs A provided with scalloped thumb nuts B. The recess 12 is of a depth substantially equal to the length of the chuck 14, and thus said chuck is held against longitudinal movement between said plate and the rear wall 16 of the recess 12. The chuck 14 is adapted to grip the tube 17 as the end of the latter is to be deformed, and the plate 15 is provided with a central bore 18 through which the tube is inserted.

Figure 6:
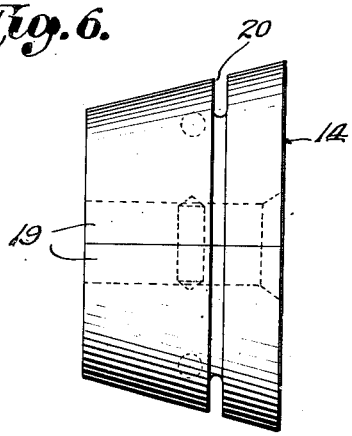
Figure 6 is a side elevational view thereof.
Figure 5:
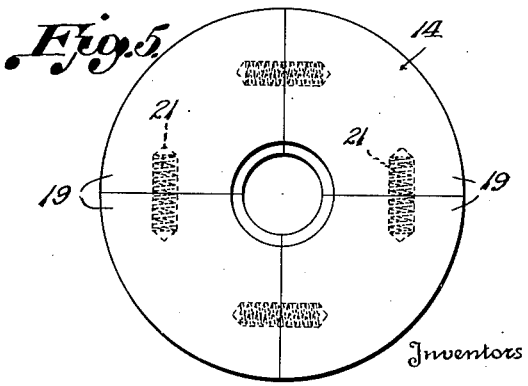
Figure 5 is an end elevational view of the tube holding chuck.

As shown in Figures 5 and 6 of the drawings, the chuck 14 comprises four tapered segmental members 19, the outer periphery of which is formed with an annular groove 20 for receiving a snap ring. This snap ring 20' maintains the segments in unitary relation at all times. The chuck further includes coil springs 21 mounted in drilled holes in each segment so that the segments will be urged out of tube gripping engagement for permitting the completed tube to be readily removed and a new one inserted therefor. As will hereinafter appear, the segments of the chuck are urged into tube gripping engagement by means of the cam ring 13, and it is to be understood that as the cam ring moves out of contact with the chuck, the coil springs 21 cause the segments to spring away from tube gripping engagement.

The cam ring 13 is also mounted within the annular recess 12, said ring having a bore 22 tapering downwardly and outwardly and generally conforming to the shape of the outer periphery of the chuck 14. Thus when the cam ring is shifted toward the right as viewed in Figure 2, the chuck segments are actuated radially inward to grip the tube 17 for the end deforming operation. The cam ring 13 is actuated by the piston 9 in the rear cylinder 6 and is connected to said piston by means of four draw bolts 23. The forward end of the draw bolts 23 are provided with knurled nuts 24 which extend through the plate 15 and are held against the ring 13 as shown in Figure 2. The other end of the draw bolts 23 screw threadedly engage a plate 25 which plate is mounted on the end 26 of the piston 9, being locked thereon by means of the lock nut 27'. The piston 9 is formed with a central bore 27 throughout its length and mounted within said bore is a guide sleeve 28 whose end 29 screw threadedly engages the spacer member 7. Thus, it will be seen that as the piston 9 moves toward the right or left as viewed in Figure 2, it will be guided on the sleeve 28 and will carry with it the plate 25, draw bolts 23 and cam ring 13 since these parts are all interengageable. As before indicated, movement of the cam ring 13 to the left releases the chuck 14 so that a tube can be released and a new tube inserted.

This piston 8 is movable toward the left as viewed in Figure 2 for deforming the end 30 of the tube 17 held within the chuck 14. This piston is formed with a central bore 31 in which is received a shaft 32 carried by the spacer member 7, suitable packing 33' being provided for sealing the tube on the shaft, the shaft being adapted to guide the piston in its movement. The end 33 of the piston 8 is hollow and extends through front upright member 2. This end supports a cylindrical shaped flaring element 34 backed at one end by a tension spring 35, its other end being cone-shaped as indicated at 36 for flaring the tube end 30. The flaring element 34 is provided with an annular flange 37 that is located within a counterbore 37' in upright member 2, forming an abutment shoulder for the piston end 13. This annular flange is also engageable with a pin 38 disposed in said counterbore for properly locating the end of the tube with respect to the chuck 14. The pin 38 is eccentrically mounted in a sleeve member 39 so that when the sleeve is rotated the pin moves forward and backward as desired with respect to the chuck 14. The sleeve 39 is yieldably held in any set position by a spring member 40 which engages notches 41 in the face of the enlarged end 42 of the sleeve. Only 180 degrees of the face is notched since obviously 180 degrees turning of the sleeve will shift the pin 38 from its rearmost to its foremost position. Rotation of the sleeve is effected through the lug 43. After the tube has been positioned and locked within the chuck 14, movement of the piston 8 to the left will cause the end 33 thereof to engage the annular flange 37 for forcing the conical end 36 of the flaring element 34 into the end of the tube for flaring the end of the tube. The means for actuating the pistons 8 and 9 will be hereinafter more fully described.

The means of operating the machine is preferably hydraulic, and as shown in Figure 3 of the drawings, the upright 2 is formed with a fluid passage 44 terminating at 45 within the cylinder 5, and communicating with the left hand side of the piston 8. Likewise, upright 3 has a fluid passage 46 therein terminating at 47 and communicating with the right hand end of the piston 9. The spacer member 7 has a passage 48 terminating at 49 and communicating with the left hand side of piston 9. The spacer member 7 is further formed with a passage 50 to afford communication between the cylinders 8 and 9. Mounted centrally of the spacer 7 and projecting beyond the end thereof is a restrictor or needle valve 51, the lower end of which is movable in an aperture 52 communicating with the passage 50. The projecting end of the valve 51 carries a handle 53 for rotation of the valve when desired, to adjust the passage of fluid through the aperture 52. As shown in Figure 2 of the drawings the aperture 52 communicates with a horizontal passage 54 leading into the cylinder 8. The passage 50 has mounted therein a ball check valve 54' backed by a coil spring 55 removably held in the passage by means of a lock ring 56. As will hereinafter appear, the check valve 54' prevents passage of the fluid directly into the cylinder 5 from the cylinder 6.

The schematic diagram of the hydraulic circuit for operating the machine is illustrated in Figure 4 and includes a reservoir 57, pump 58, relief valve 59 and reversing valve 60. The reversing valve is adapted to be actuated for conveying the fluid from the reservoir to the pistons 8 and 9 for moving the piston 9 to the right and the piston 8 to the left during the tube end deforming operation, and after the deformation of the tube, to move the piston 8 to the right and the piston 9 to the left for releasing the completed tube. It is thought that the operation of the hydraulic circuit is readily obvious from an inspection of Figure 4 of the drawing. With the reversing valve 60 in the position shown in full lines, fluid passes from the reservoir through the ports a and b into the line 61 and from the line 61 to the line 62 which communicates with passage 48 for moving the piston 9 to the right, piston 9 being the chuck actuating piston. At the same time fluid will enter the cylinder 5 through the restrictor valve 51 and line 63 to move the flaring cone actuating piston to the left. As the respective pistons move, the fluid exhausted from the cylinders will pass through the lines 64 and 65 and through the ports c and d of the reversing valve 60 to be returned to the reservoir through the line 66. When the reversing valve is shifted to the dotted line position, fluid from the reservoir will pass through the ports a and c into the line 67 and from the line 67 up through the lines 64 and 65 communicating with the passages 44 and 46 respectively, for moving the flaring cone actuating piston to the right and the chuck actuating piston to the left. Fluid from the cylinder 5 will then be exhausted through the line 63, restrictor valve 51 and check valve 54, entering the line 61 and returning to the reservoir 57 through the reversing valve ports b and d. Likewise, fluid being exhausted from the cylinder 6 will enter the lines 62 and 61 and return to the reservoir through the ports b and d. The check valve 54 being positioned between the cylinders 5 and 6 assures quick release of the chuck 14 and also quick withdrawal of the flaring element 34 after the deforming operation has been completed.

In the operation of the device, let it be assumed that the reversing valve 60 is in the dotted line position at which time pistons 8 and 9 are in engagement with the spacer member 7. In this position the segments 19 of the chuck 14 are separated so that a tube can be readily inserted therein and pushed against the cone shaped end 36 of the flaring element 15. With the piston 8 thus in engagement with the spacer member 7, the outer end 33 thereof will be out of engagement with the flaring element flange 37 so that as the tube is pressed against the flaring element, said element moves toward the right until its flange 37 engages the pin 38. Of course, prior to starting operation, the pin 38 has been properly positioned for correct location of the tube, and thus said tube, when the flange 37 engages the pin 38, is properly located with respect to the chuck. With the tube held in this position, the reversing valve 60 is shifted to the solid line position whereby fluid will enter the cylinder 6 through the passage 48 from the line 62 and the pressure of the fluid will move the piston 9 on its sleeve 28 toward the right moving the cam ring 13 toward the right through the draw bolts 23 and plate 26, causing the segments 19 of the chuck 14 to be contracted to grip the tube. After the chuck segments have closed to grip the tube, pressure will build up in the cylinder 6 so that fluid under pressure travels through the passage 50, aperture 52 and passage 54 into the cylinder 5 to actuate the piston 8 toward the left, carrying with it the end 33 and effect contact thereof with the flange 37. This will move the flaring element 34 into the tightly gripped tube end for flaring the end thereof as indicated at 68. The reversing valve 60 is then shifted to the dotted line position whereby the pistons 8 and 9 are actuated toward the spaced member 7. Movement of the reversing valve to the dotted line position causes fluid to enter the cylinder 5 through the passage 44, moving the piston 8 toward the right and exhausting the fluid therefrom through the passage 50 since the check valve 54' will be moved away from its seat by the pressure of the fluid. Likewise, the piston 9 is actuated toward the left by fluid entering the passage 46 and as the piston moves toward the left the fluid within the cylinder will be exhausted through the passage 49 to be returned to the reservoir. Of course, the fluid being exhausted from the cylinder 5 which passes through the check valve control passage 50 will also be returned to the reservoir through the spacer member passage 48.

From the above description when taken in connection with the accompanying drawings it will be apparent that there has been provided a machine adapted to be used for flaring or otherwise deforming a tube end in which the tube clamping means is operated by one piston and the tube end deforming means is operated by another piston. The restricted passage which is controlled by the needle valve 51 causes the tube end to be initially clamped by the chuck and then deformed by the deforming element. The check valve positioned between the pistons assures quick release of the clamp or chuck and quick withdrawal of the deforming tool after the deforming operation has been completed.

In the modified form of construction shown in Figure 7, the operating elements are all of similar construction to those shown in Figure 2. The recess in which the flaring head 36 operates has been enlarged so as to permit the shifting of the position of the head in the sleeve 33 of the reciprocating piston which moves the flaring head for flaring the tube. In this form of construction, a washer 71 is placed between the flange 37 on the flaring head and the sleeve 33. This will offset the head outwardly slightly. As shown in Figure 8, washers of various sizes may be used. When a tube of smaller diameter than the tube 70 is to be flanged, then the chuck will be changed to conform to the size of the tube and a smaller washer 71 inserted so that upon the reciprocation of the piston 8, the flaring head will be moved into the tube only a sufficient distance to form a flare on the smaller tube. If a larger tube is to be flared, then the chuck members will be changed to conform to the larger tube and a larger washer will be inserted so that the flaring head will move further into the tube, and thus a larger tube will be flared. In this modified form of structure shown in Figure 7, by selecting the proper thickness of washer and the proper chucking members, tubes of various sizes may be flared.

The operation of the machine with this form of the invention is exactly the same as that above described and it is not believed that further description is necessary.

In Figures 9 and 10 of the drawings there is illustrated a modified form of construction for forming a double flare on a tube. In this form of the invention the chuck, cam ring, locating pin, pistons and hydraulic actuating means are the same as in the preferred form of the invention. It will be noted that a different type of flaring element is associated with the piston 8, the flaring element in this instance having a cylindrical end 72 received within the end 33 of the piston, said piston end adapted to engage the collar 74. Extending outwardly from the collar 74 is a cylindrical portion 75 carrying a reduced end 76 to be inserted within the tube 77. The portion 75 is moved into engagement with the chuck 14 as the piston 8 moves toward the left forming the single flare 78 on the tube. Of course, the tube 77 is positioned on the end 76 and pushes the deforming element rearwardly until the shoulder 74 contacts the pin 38 prior to the deforming operation in the manner previously described. In order to form the double flare 79 shown in Figure 10 of the drawing, the deforming element 72 is substituted with a second deforming element 80. The deforming element 80 differs from deforming element 72, only in shape and size of the tube contacting end 81. It will be noted that the end 81 is conical shaped and is relatively short in length whereas the end 76 is cylindrical shaped and is relatively long in length thereby projecting within the tube a greater distance than the end 81. As the deforming element 80 is moved toward the left upon actuation of the piston 8, the end 81 will deform the tube 77 with the double flared portion 79, the operation being readily obvious from the foregoing description.

In Figure 11 of the drawings there is shown a construction whereby a bead can be formed on the tube with the same machine used for forming a flare thereon. The only change made is in the deforming element, and it will be noted that there is provided a deforming element 82 which is slidably mounted within the end 33 of the piston 8, the portion 83 of the deforming element being formed with a central bore 84 for receiving the shaft 32. The deforming element 82 carries a mandrel 85 which is screwthreadedly engaged within the shaft 32, said mandrel adapted to be inserted within the tube 86 to be beaded. The construction of the chuck 14 and cam ring 13 and the operation of these elements is the same as in the preferred form.

A collar or flange 87 is formed on the deforming member 82 which flange is adapted to contact the locating pin 38 and to be contacted by the end 33 of the piston 8 during the deforming operation. The chuck contacting face of the deforming member 82 is formed with an annular recess 88, and a counterbore 89 communicating therewith, the depth of the recess 88 being substantially equal to the size of the bead 90 to be formed on the tube 86.

In the operation of this form of the invention, with the chuck segments in disengaged position, the tube 86 is slid on the mandrel 85 and pushed thereon until its end is held within the counterbore 89. The entire deforming element is then pushed rearwardly until the shoulder 87 engages the pin 38 thereby locating the tube relative to the chuck 14. As the piston 8 is moved toward the left, in the manner previously described, the deforming element being brought into engagement with the face of the chuck through the end 33 of piston 8, will effect deformation of the tube 86 into the shape of the bead 90 shown.

It is obvious that many changes may be made in the details of construction and arrangement of parts without departing from the spirit of the invention as set forth in the appended claims.

We claim:

1. In a tube deforming machine, the combination of a supporting base, front and rear upright members attached to said base, said front upright member being formed with an annular recess, a tube end clamping chuck held within said recess, means for urging said chuck into and out of tube clamping engagement, tube end deforming means movable in said front upright member, a spacer member between said upright members, a cylinder disposed on each side of said spacer member, pistons operable in said cylinders, a restricted passage in said spacer member communicating with said cylinders, and means whereby one piston is operated to first cause said means to urge the chuck into tube end clamping engagement and subsequently operate the other piston to actuate said tube end deforming means.

2. In a tube deforming machine, the combination of a supporting base, front and rear upright members attached to said base, said front upright member being formed with an annular recess, a tube end clamping chuck held within said recess, means to properly locate said tube end relative to said chuck, means for urging said chuck into and out of tube clamping position, tube end deforming means movable in said front upright member, a spacer member between said upright members, a cylinder disposed on each side of said spacer member, pistons operable in said cylinders, a restricted passage in said spacer member communicating with said cylinders, and means whereby one piston is operated to first cause said means to urge the chuck into tube end clamping engagement and subsequently operate the other piston to actuate said tube end deforming means.

3. In a tube deforming machine, the combination of a supporting base, front and rear upright members attached to said base, said front upright member being formed with an annular recess, a tube end clamping chuck held within said recess, means for urging said chuck into and out of tube clamping engagement, tube end deforming means, a spacer member between said upright members, a cylinder disposed on each side of said spacer member, pistons operable in said cylinders, a passage in said spacer member communicating with said cylinders, means for operating said pistons to cause the tube end to be first clamped and then deformed, and valve means in said passage to assure quick release of said clamped end and withdrawal of the deforming tube after completion of the deforming operation.

4. In a tube deforming machine, the combination of tube clamping means, tube deforming means, a first chamber and a fluid pressure operated piston movable therein and operatively connected with said clamping means, a second chamber and a fluid pressure operated piston movable therein and operatively connected with said deforming means, means for directing pressure fluid into the first chamber to move the piston therein for actuating the clamping means, and means for directing pressure fluid from said first chamber into the second chamber to move the piston therein for actuating said deforming means.

5. The structure defined in claim 4, wherein said last named means comprises a controllable bleed duct located between said first and second chambers.

6. The structure defined in claim 4, and check controlled means located between said chambers to assure quick release of said clamping means and withdrawal of the deforming means after completion of the deforming operation.

7. In a tube deforming machine, the combination of tube clamping means, tube deforming means, a first chamber and a fluid pressure operated piston movable therein and operatively connected with said clamping means, a second chamber and a fluid pressure operated piston movable therein and operatively connected with said deforming means, said chambers being coaxially arranged for permitting coaxial movement of said pistons, means for directing pressure fluid into the first chamber to move the piston therein for actuating the clamping means, and means for directing pressure fluid from said first chamber into the second chamber to move the piston therein for actuating said deforming means.

8. In a tube deforming machine, the combination of tube clamping means, tube deforming means, a first chamber and a fluid pressure operated piston movable therein and operatively connected with said clamping means, a second chamber, and a fluid pressure operated piston movable therein and operatively connected with said deforming means, said chambers being coaxially arranged in spaced relation, means for directing pressure fluid into the first chamber to move the piston therein and actuate the clamping means, and valve controlled means between said chambers for directing pressure fluid from said first chamber into the second chamber to move the piston therein for actuating said deforming means.

9. In a tube deforming machine, the combination of a tube clamping means, a tube end deforming device, means for supporting and positively moving said device into the tube in a direction longitudinally of the tube for deforming the end thereof, a spring for initially moving said tube end deforming device toward the tube clamping means and away from the moving means therefor, and means for limiting the extent of movement of the tube end deforming device toward the operating means therefor when a tube is inserted in the clamping means and pushed against the tube end deforming device whereby the extent to which the tube may be inserted into the tube clamping means may be determined.

10. In a tube deforming machine, the combination of a tube clamping means, a tube end deforming device, means for supporting and positively moving said device into the tube in a direction longitudinally of the tube for deforming the end thereof, a spring for initially moving said tube end deforming device toward the tube clamping means and away from the moving means therefor, a stop for limiting the extent of movement of the tube end deforming device toward the operating means therefor when a tube is inserted in the clamping means and pushed against the tube end deforming device, and means for adjusting the position of said stop whereby the extent to which the tube may be inserted into the tube clamping means may be varied.

HENRY E. HULL.
THEODORE H. ROTE.

REFERENCES CITED

The following references are of record in the file of this patent:

UNITED STATES PATENTS

| Number | Name | Date |
| --- | --- | --- |
| 766,227 | Doolittle | Aug. 2, 1904 |
| 871,379 | Troyer | Nov. 19, 1907 |
| 989,805 | Reynolds | Apr. 18, 1911 |
| 1,766,098 | Booth | June 24, 1930 |
| 1,943,089 | Rosenberg | Jan. 9, 1934 |
| 2,015,685 | Martin | Oct. 1, 1935 |
| 2,070,898 | Hall et al. | Feb. 16, 1937 |
| 2,176,188 | Polle et al. | Oct. 17, 1939 |
| 2,326,541 | Kuehn | Aug. 10, 1943 |
| 2,394,841 | Bugg | Feb. 12, 1946 |